Patented Sept. 12, 1950

2,521,914

UNITED STATES PATENT OFFICE 2,521,914

RESINOUS COPOLYMERS COMPRISING ACETYLATED PRODUCTS OBTAINED FROM THE ENOL FORM OF KETO-ESTERS

Hugh J. Hagemeyer, Jr., Kingsport, Tenn., assignor to Eastman Kodak Company, Rochester, N. Y., a corporation of New Jersey No Drawing. Application May 28, 1948, Serial No. 29,918

17 Claims. (Cl. 260—86.1)

This invention relates to resinous polymers comprising acetylated enols of esters of acetoacetic or levulinic acids.

Whereas previous attempts to homopolymerize acetylated enols of ketoesters have been unsuccessful, I have now found that these esters are useful in the preparation of resinous copolymers, which can be made into molded objects, coated into films, lacquers, sheets, foils, and the like.

Accordingly, it is an object of my invention to provide new resinous copolymers comprising acetylated enols of ketoesters. Another object of my invention is to provide a process for preparing these copolymers. Still another object is to provided molded objects, films, foils, sheets, lacquers, and the like, prepared from these copolymers. Other objects will become apparent from a consideration of the following description.

According to my invention these objects are accomplished by interpolymerizing the acetylated enol forms of a ketoester, and an unsaturated, copolymerizable compound.

The acetylated enols of levulinic or acetoacetic acid esters useful in practicing my invention can conveniently be prepared by the acetylation of acetoacetic or levulinic acid esters under conditions favorable to enolization. Such a process is described in Spence and Degering U. S. Patent 2,407,302, dated September 10, 1946. According to the process described in this patent, the esters of acetoacetic or levulinic acids are acetylated with ketene ($CH_2=C=O$) at a temperature of from about 50 to 125° C. in the presence of a catalyst, such as sulfuric acid, chlorosulfonic acid, methylsulfuric acid, sulfamic acid, etc. The acetylation of ethyl acetoacetate with ketene, for example, yields a mixture of two esters which can not be separated by ordinary means. These esters can be represented by the formulas:

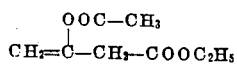

and

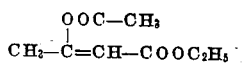

The reaction usually produces a 50:50 mixture of esters represented by the above formulas. Since these ketoesters can enolize in either of two directions, for example, in the case of ethyl acetoacetate:

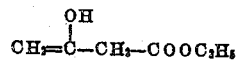

and

the acetylation mixture usually contains acetylated enols of both forms, the amounts depending on the condition of the acetylation, such as catalyst concentration, and the particular ketoester being acetylated. In acetylation with ketene a molar excess is ordinarily employed to increase the yields, usually about 1.5 times the calculated amount being used, although from 1.1 to 3.0 molecular proportions of ketene for each molecular proportion of the ketoester can be used to advantage. The catalysts useful for the acetylation can be represented by the formula:

wherein X represents a halogen atom, a hydroxyl group, or an organic group containing at least one non-metallic atom selected from the group consisting of oxygen and nitrogen, said organic group being attached to the sulfur atom through said non-metallic atom. Examples of such catalysts are given above. The catalyst concentration can vary, depending on the particular ketoesters used. Generally from 0.1 to 2% by weight, based on the weight of ketoester, can be used to advantage. Inert solvents, such as the normally liquid aliphatic or aromatic hydrocarbons, can be used, if desired, although there is generally no advantage in doing so since the ketoesters are liquids, and provide a convenient medium for carrying out the reaction.

Alternatively, in lieu of acetylating the levulinic or acetoacetic acid ester with ketene, isopropenyl acetate can conveniently be employed. Such a process comprises reacting isopropenyl acetate with the ester of acetoacetic or levulinic acid at a temperature of 50° C. to the reflux temperature of the reactants, in the presence of an acid catalyst, such as sulfuric acid, chlorosulfonic acid, methylsulfuric acid, sulfamic acid, N-acetylsulfamic acid, etc. Such catalyst can be represented by the formula:

wherein X has the definition set forth above. The catalyst can be used in a concentration of from 0.01 to 1% by weight, based on the weight of the ketoester. The ratio of the isopropenyl acetate to the ketoester can vary from an equimolecular proportion of the isopropenyl acetate to an excess of 3 molecular proportions of the isopropenyl acetate for each molecular proportion of the ketoester, i. e., a ratio of isopropenyl acetate to ketoester of 1:1 to 3:1. An inert solvent, such as an aliphatic or aromatic hydrocarbon which is liquid at normal temperatures, can be used, if desired. When the process is carried out in accordance with the above directions, the acetylation is generally complete within 30 minutes to 4 hours, and the reaction mixture can be distilled to give a mixture of the acetylated enols of the ketoesters. The following examples will illustrate the manner whereby I prepare the acetylated enols of the ketoesters used in practicing my invention.

*Example A*

65 gms. (0.5 mol) of ethyl acetoacetate were mixed with 100 gms. (1 mol) of isopropenyl acetate (propen-2-ol acetate), and 10 drops of sulfuric acid were slowly added. The mixture was then placed in an all-glass reflux set up, and refluxed for one hour. The reaction mixture was then distilled under a vacuum, and 30 cc. of acetone were distilled off. The catalyst was neutralized with sodium acetate, and the mixture distilled to give a mixture of two enol acetates boiling at 94° C. at 10 mm. These esters had the formulas:

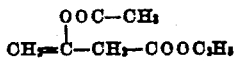

and

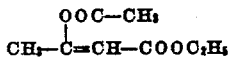

The former compound predominated in the reaction mixture. The yield was 92%.

*Example B*

72 gms. (0.5 mol) of ethyl levulinate and 100 gms. (1 mol) of isopropenyl acetate were intimately mixed, and 20 drops of sulfuric acid gradually added. The mixture was then placed in an all-glass reflux set-up, and held under reflux for one hour. After distilling off the formed acetone, the catalyst was neutralized with sodium acetate and the mixture of enol acetates formed was distilled off at 89° C. at 5 mm. These esters had the formulas:

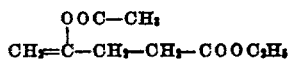

and

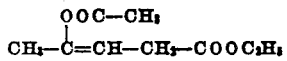

The yield amounted to 45 grams.

Operating in a similar manner, and substituting molecularly equivalent amounts of other esters of acetoacetic or levulinic acids in the above examples, still other acetylated enols can be prepared. For example, when a molecularly equivalent amount of benzyl acetoacetate replaces the ethyl acetoacetate in Example A, a mixture of esters having the formulas:

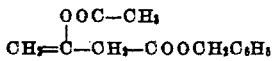

and

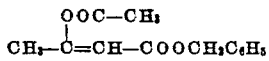

can be obtained. The ketoesters, from which the acetylated enols useful in practicing my invention can be prepared by reaction with either ketene or isopropenyl acetate, can be conveniently represented by the formulas:

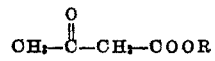

and

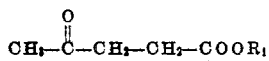

wherein R and $R_1$ each represents a member selected from the group consisting of an alkyl group, such as methyl, ethyl, propyl, isopropyl, n-butyl, secondary and isobutyl, etc. (i. e., an alkyl group of the formula $C_nH_{2n+1}$ wherein $n$ is a positive integer from 1 to 4) and a benzyl group. Typical esters include methyl acetoacetate, methyl levulinate, ethyl acetoacetate, ethyl levulinate, propyl levulinate, isopropyl levulinate, isopropyl acetoacetate, n-butyl levulinate, isobutyl levulinate, isobutyl acetoacetate, sec-n-butyl levulinate, benzyl acetoacetate, etc. In preparing polymers from these acetylated enols, the mixture obtained after neutralization of catalysts and distillation of the residue, is used without further treatment, although a second distillation can sometimes be used to give a mixture having a more limited boiling range.

The unsaturated, copolymerizable compounds which are useful in preparing the polymers of the present invention contain one or more of

groups. Typical are acrylonitrile, α-methacrylonitrile, acrylic acid, α-methacrylic acid, styrene, unsaturated ketones represented by the formula:

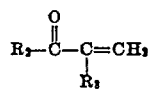

wherein $R_2$ represents an alkyl group, such as methyl, ethyl, n-propyl, isopropyl, n-butyl, sec-n-butyl and isobutyl, etc. (i. e., an alkyl group of the formula $C_nH_{2n+1}$ wherein $n$ is a positive integer from 1 to 4) and $R_3$ represents a hydrogen atom or a methyl group (including, for example, methyl vinyl ketone, ethyl vinyl ketone, n-propyl vinyl ketone, n-butyl vinyl ketone, methyl isopropenyl ketone, ethyl isopropenyl ketone, etc.), esters represented by the formula:

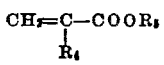

wherein $R_4$ represents a hydrogen atom or a methyl group, and $R_5$ represents an alkyl group, such as methyl, ethyl, n-propyl, isopropyl, n-butyl, isobutyl, sec-n-butyl (i. e., an alkyl group of the formula $C_nH_{2n+1}$ wherein $n$ is a positive integer from 1 to 4) or a benzyl group (including, for example, methyl acrylate, methyl α-methacrylate, ethyl acrylate, ethyl α-methacrylate, n-propyl acrylate, n-propyl α-methacrylate, isopropyl acrylate, isopropyl α-methacrylate, n- butyl acrylate, n-butyl α-methacrylate, isobutyl acrylate, isobutyl α-methacrylate, sec-n-butylacrylate, sec-n-butyl-α-methacrylate, benzyl acrylate, benzyl α-methacrylate, etc.), vinyl esters represented by the formula:

$$R_6\text{—COOCH}=CH_2$$

wherein $R_6$ represents an alkyl group, such as methyl, ethyl, n-propyl, isopropyl, etc. (i. e., an alkyl group of the formula $C_nH_{2n+1}$ wherein $n$ is a positive integer from 1 to 3, including, for example, vinyl acetate, vinyl propionate, vinyl n-butyrate, vinyl isobutyrate, etc.), and α-acyloxyacrylonitriles represented by the formula:

$$CH_2=C-CN$$
$$\quad\quad |$$
$$\quad OOC-R_7$$

wherein $R_7$ represents an alkyl group, such as methyl, ethyl, n-propyl, isopropyl, etc. (i. e., an alkyl group of the formula $C_nH_{2n+1}$ wherein $n$ is a positive integer from 1 to 3, including, for example, α-acetoxyacrylonitrile, α-propionoxyacrylonitrile, α-n-butyroxyacrylonitrile, α-isobutyroxyacrylonitrile, etc.). More than one of the compounds represented by the above formulas, or listed above, can be used in a single polymerization, although there is generally no advantage in using more than two of such compounds.

The polymerization can be accelerated by heating, or by the use of polymerization catalysts which are known to accelerate the polymerization of vinyl-type compounds. Typical catalysts include the organic peroxides, such as benzoyl, acetyl, acetyl benzoyl, lauroyl, oleoyl, etc. peroxides, perborates, (such as those of sodium and potassium), persulfates (e. g., the alkali metal persulfates, such as those of sodium and potassium), hydrogen peroxide, etc. The quantity of catalyst used in the polymerization can be varied as desired, however, I have found that from 0.01 to 2% by weight, based on the total weight of the polymerizable components in the reaction mixture, of polymerization catalyst is usually sufficient. The temperatures at which my polymerization can be carried out vary from ordinary room temperature (20 to 25° C.) to 100° C. Generally temperatures from 40 to 80° C. can be used to advantage.

My process can advantageously be carried out in a solvent or diluent. The diluent, if employed, is conveniently a solvent for the polymer. Typical diluents include benzene, toluene, acetone, etc. The polymer can be liberated from its solutions by pouring the solution into a medium in which the polymer is insoluble, e. g., water, methanol, ethanol, etc. My polymerization can also be carried out by the bead or emulsion method, in which water or some other medium in which the monomers are insoluble is employed as a dispersing medium, with or without emulsifying agents. The emulsion method of polymerization is particularly suitable where a large ratio of the enol ester to the other unsaturated, copolymerizable compound is desired. Where one of the components of the reaction mixture polymerizes at a faster rate than the other, the component having the faster rate of polymerization can be added over a period of time and at such a rate that it is used up substantially as fast as it is added. This method of polymerization is conveniently adapted to give polymers having varying percentages of a particular unsaturated, copolymerizable compound.

The ratio of acetylated enols of the ketoester to the other unsaturated copolymerizable compound can be varied, and is a function of the reactants employed. Generally, I have found that a monomeric mixture consisting of from 30 to 95% by weight of the acetylated enols of the ketoester and from 5 to 70% by weight of the other unsaturated, copolymerizable compound is adequate for the purposes of my invention. Such a ratio gives a copolymer having from 2 to 30% by weight of the enol ester and from 70 to 98% by weight of the other unsaturated, copolymerizable compound in the polymer molecule, depending on the conditions employed in the polymerization. More than one unsaturated, copolymerizable compound can be interpolymerized with my acetylated enols of the ketoester, as has been pointed out above. If a comparatively large ratio of the acetylated enols of the ketoester to the other unsaturated compound has been used, the resulting product may, or may not, be only slightly viscous, or may consist of the polymer dissolved in the excess of the acetylated enols of the ketoesters. The resinous copolymer can then be obtained advantageously by adding a solvent to the reaction mixture which dissolves the excess acetylated enols of the ketoester, but not the copolymer, thus precipitating the copolymer. Typical solvents for this purpose include methanol, ethanol, acetic acid, diethyl ether, etc.

The following examples will illustrate further the manner whereby I practice the process of my invention.

*Example I*

A mixture consisting of 7.8 gms. of the acetylated enols of ethyl acetoacetate, prepared as described above, 5 gms. of methyl α-methacrylate and 0.128 gms. of acetyl benzoyl peroxide was placed in a glass bottle and heated on a water bath at 50° C. for seven days. At the end of this time the reaction mixture had set to a clear, hard and colorless mass. This resinous product was dissolved in acetone and the viscous solution poured into methanol where the polymer precipitated. The precipitate was then taken up in acetone and again precipitated in methanol. This procedure was repeated. There was thus obtained 10 gms. of a white, fibrous resin which was found to contain 4.6% by weight of acetyl, corresponding to 18.4% by weight of the acetylated enols of the ethyl acetoacetate in the copolymer.

*Example II*

A mixture consisting of 7.8 gms. of the acetylated enols of ethyl acetoacetate, prepared as described above, 5 gms. of vinyl acetate and 0.128 gms. of acetyl benzoyl peroxide was placed in a glass bottle and heated on a water bath at 50° C. for seven days. At the end of this time the reaction mixture had set to a thick, resinous mass which was dissolved in acetone and precipitated in methanol. This procedure was then repeated as described in Example I. There were thus obtained 8 gms. of a resinous copolymer of vinyl acetate and the acetylated enols of ethyl acetoacetate.

*Example III*

9.3 gms. of the acetylated enols of ethyl levulinate, prepared as described above, 5 gms. of methyl α-methacrylate and 0.143 gms. of acetyl benzoyl peroxide were placed in a glass bottle, and the mixture heated on a water bath at 50° C. for seven days. At the end of this time the reaction mixture had set to a clear, hard, colorless mass, which was dissolved in acetone and precipitated in methanol. This procedure was repeated as described in Example I to give a white, fibrous resin.

When a molecularly equivalent amount of α-acetoxy-acrylonitrile replaces the methyl α-methacrylate in the above example, a hard, tough copolymer is obtained.

*Example IV*

A mixture consisting of 9.3 gms. of the acetylated enols of ethyl levulinate, prepared as described above, 5 gms. of vinyl acetate and 0.143 gms. of acetyl benzoyl peroxide was placed in a bottle and heated on a water bath at 50° C. for seven days. At the end of this time the reaction mixture had set to a clear, hard, colorless mass, which was dissolved in acetone and precipitated in methanol. After repeating this procedure as described in Example I, a white, fibrous, resinous copolymer was obtained.

When a molecularly equivalent amount of the acetylated enols of n-butyl levulinate replaces the acetylated enolates of ethyl levulinate in the above example, a tough, hard resin is obtained.

*Example V*

7.8 gms. of the acetylated enols of ethyl acetoacetate, prepared as described above, 5 gms. of methyl α-methacrylate, 5 gms. of vinyl acetate and 0.178 gms. of acetyl benzoyl peroxide were placed in a bottle and the mixture heated on a water bath at 50° C. for four days. At the end of the heating period the reaction mixture had set to hard, clear, colorless mass, which was dissolved in acetone and precipitated in methanol. After repeating this process as described in Example I, 14 gms. of resinous copolymer were obtained as a reaction product.

When a molecularly equivalent amount of the acetylated enols of benzyl acetoacetate replace the acetylated enols of ethyl acetoacetate in the above example, a resinous polymer suitable for extrusion into tough, flexible sheets can be obtained.

*Example VI*

A mixture consisting of 7.8 gms. of the acetylated enols of ethyl acetoacetate prepared as described above, 6 gms. of α-acetoxyacrylonitrile and 0.138 gms. of acetyl benzoyl peroxide was placed in a glass bottle and heated on a water bath at 50° C. for four days. At the end of this time, the reaction mixture had set to a hard, pale yellow polymer, which was excellently suited for molding into shaped or molded objects. On analysis, this polymer was found to have a nitrogen content of 8.3%, corresponding to 34% by weight of the acetylated enols of ethyl acetoacetate in the copolymer.

When a molecularly equivalent amount of the acetylated enols of methyl levulinate is substituted for the acetylated enols of ethyl acetoacetate in the above example, a hard, clear copolymer can be obtained.

*Example VII*

Mixtures consisting of the acetylated enols of methyl levulinate (prepared as described above) and styrene, in the quantities given in the table below, were heated in the presence of 1% by weight of acetyl benzoyl peroxide, based on the combined weights of the enol ester and styrene, on a water bath at 50° C. for 14 days. At the end of this time the reaction mixtures had all set to clear, hard masses which were dissolved in acetone and precipitated in methanol. After repeating this process as described in Example I above, the polymers were obtained as fine powders in the amounts given in the table below. Each polymer was analyzed for per cent by weight of acetyl, and the results are given below.

| Weight, enol ester | Weight, Styrene | Yield, Polymer | Per cent by weight, Acetyl | Per cent by weight, enol ester in polymer |
|---|---|---|---|---|
| Grams | Grams | Grams | | |
| 10 | 10 | 9 | 1.98 | 7.92 |
| 10 | 8 | 9 | 2.38 | 9.5 |
| 10 | 6 | 9 | 2.60 | 10.4 |
| 10 | 4 | 7 | 2.78 | 11.1 |

*Example VIII*

100 gms. of the acetylated enols of ethyl acetoacetate, prepared as described above, and 100 gms. of methyl α-methacrylate were added to 400 gms. of distilled water. 1.0 gm. of gum arabic and 0.5 gms. of acetyl benzoyl peroxide were added, and the mixture was thoroughly shaken. After tumbling the reaction mixture at 60° C. for 48 hours, a white latex was obtained, which was coagulated by the addition of sodium sulfate. After drying the polymer in a hot air oven, a yield of 164 gms. of dried product was obtained.

When a molecularly equivalent amount of n-butyl α-methacrylate replaces the methyl α-methacrylate in the above example, a resinous copolymer can be obtained.

*Example IX*

A mixture consisting of 7.8 gms. of the acetylated enols of ethyl acetoacetate, prepared as described above, 5 gms. of styrene and 0.128 gm. of benzoyl peroxide were placed in a glass bottle and heated on a water bath at 50° C. for eight days. At the end of this time, the reaction mixture had set to a soft, clear polymer which was found to contain 3.7% by weight of acetyl, corresponding to 14.8% by weight of the enol ester in the polymer.

When a molecularly equivalent amount of the acetylated enols of methyl acetoacetate replace the acetylated enol ester of ethyl acetoacetate in the above example, similar soft, clear copolymers can be obtained.

*Example X*

A mixture consisting of 7.8 gms. of the acetylated enols of ethyl acetoacetate, prepared as described above, 5 gms. of methyl isopropenyl ketone and 0.128 gm. of acetyl benzoyl peroxide was placed in a glass bottle and heated on a water bath at 50° C. for six days. At the end of this time the reaction mixture had set to a clear, hard mass, which was dissolved in acetone and precipitated in methanol to give a white, fibrous polymer. The acetyl content of the polymer as determined by saponification was found to be 4.4%, equivalent to an acetoxyl content of 6.04%. This corresponds to 17.6% by weight of the acetylated enols in the copolymer.

When a molecularly equivalent amount of the acetylated enols of methyl levulinate are substituted for the acetylated enols of ethyl acetoacetate in the above example, a similar resinous copolymer can be obtained.

*Example XI*

10 gms. of the acetylated enols of methyl levulinate, prepared as described above, 10 gms.

of methyl α-methacrylate and 0.2 gm. of acetyl benzoyl peroxide were placed in a glass bottle, and heated on a hot water bath at 50° C. for 14 days. At the end of this time the reaction mixture had set to a hard, clear, colorless mass which was dissolved in acetone and precipitated in methanol to give a white, fibrous polymer. After reprecipitating the polymer as described in Example I, and drying the precipitate to constant weight in a hot air oven at 50° C., 14 gms. of product were obtained. On analysis, the polymer was found to have an acetyl content of 4.10% by weight, equivalent to 16.4% by weight of the acetylated enols in the polymer.

*Example XII*

A mixture consisting of 5 gms. of the acetylated enols of methyl levulinate prepared as described above, 10 gms. of methyl α-methacrylate and 0.175 gm. of acetyl benzoyl peroxide was placed in a glass bottle and heated on a water bath at 50° C. for 14 days. Over this period the reaction mixture gradually set to a clear, hard mass, which was dissolved in acetone and precipitated in methanol. After repeating this procedure as described in Example I, 13 gms. of dried polymer were obtained.

Operating in a similar manner, other copolymers can be prepared according to the process of my invention by interpolymerizing my acetylated enols of levulinic or acetoacetic acid esters with any of the unsaturated, copolymerizable compounds listed above. The copolymers thus prepared are excellently suited for making into films, foils, sheets, lacquers, molded objects, etc.

Other catalysts which can be used in the preparation of the acetylated enols useful in preparing my copolymers are described in my copending application Serial No. 25,525, filed May 6, 1948, and application Serial No. 25,526, filed May 6, 1948, now U. S. Patent 2,476,860, issued July 19, 1949. These catalysts are useful not only in the reaction between ketene and an ester of acetoacetic or levulinic acid, but also in the reaction between isopropenyl acetate and esters of acetoacetic or levulinic acids.

What I claim as my invention and desire secured by Letters Patent of the United States is:

1. A resinous copolymer containing in the polymer molecule from 2 to 30% by weight of an acetylated enol of an ester selected from the group consisting of those represented by the formula:

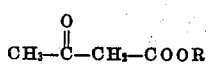

and those represented by the formula:

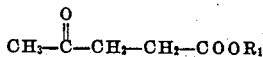

wherein R and $R_1$ each represents a member selected from the group consisting of an alkyl group of the formula $C_nH_{2n+1}$ wherein $n$ is a positive integer from 1 to 4 and a benzyl group, and from 70 to 98% by weight of a copolymerizable compound selected from the group consisting of acrylonitrile, α-methacrylonitrile, acrylic acid, α-methacrylic acid, styrene, unsaturated ketones represented by the formula:

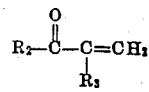

wherein $R_2$ represents an alkyl group of the formula $C_nH_{2n+1}$ wherein $n$ is a positive integer from 1 to 4, and $R_3$ represents a member selected from the group consisting of a hydrogen atom and a methyl group, esters represented by the formula:

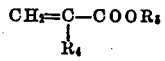

wherein $R_4$ represents a member selected from the group consisting of a hydrogen atom and a methyl group, and $R_5$ represents a member selected from the group consisting of an alkyl group of the formula $C_nH_{2n+1}$ wherein $n$ is a positive integer from 1 to 4 and a benzyl group, vinyl esters represented by the formula:

wherein $R_6$ represents an alkyl group of the formula $C_nH_{2n+1}$ wherein $n$ is a positive integer from 1 to 3, and α-acyloxyacrylonitriles represented by the formula:

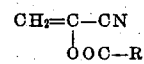

wherein $R_7$ represents an alkyl group of the formula $C_nH_{2n+1}$ wherein $n$ is a positive integer from 1 to 3.

2. A resinous copolymer containing in the polymer molecule from 2 to 30% by weight of an acetylated enol of an ester represented by the formula:

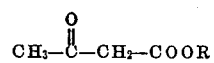

wherein R represents an alkyl group of the formula $C_nH_{2n+1}$ wherein $n$ is a positive integer from 1 to 4, and from 70 to 98% by weight of an ester represented by the formula:

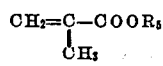

wherein $R_5$ represents an alkyl group of the formula $C_nH_{2n+1}$ wherein $n$ is a positive integer from 1 to 4.

3. A resinous copolymer containing in the polymer molecule from 2 to 30% by weight of an acetylated enol of an ester represented by the formula:

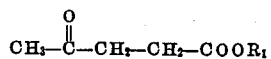

wherein $R_1$ represents an alkyl group of the formula $C_nH_{2n+1}$ wherein $n$ is a positive integer from 1 to 4, and from 70 to 98% by weight of an ester represented by the formula:

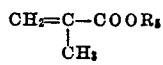

wherein $R_5$ represents an alkyl group of the formula $C_nH_{2n+1}$ wherein $n$ is a positive integer from 1 to 4.

4. A resinous copolymer containing in the polymer molecule from 2 to 30% by weight of an acetylated enol of an ester represented by the formula:

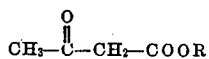

wherein R represents an alkyl group of the formula $C_nH_{2n+1}$ wherein $n$ is a positive integer from 1 to 4, and from 70 to 98% by weight of an ester represented by the formula:

wherein $R_6$ represents an alkyl group of the formula $C_nH_{2n+1}$ wherein $n$ is a positive integer from 1 to 3.

5. A resinous copolymer containing in the polymer molecule from 2 to 30% by weight of an acetylated enol of an ester represented by the formula:

$$CH_3-\overset{O}{\overset{\|}{C}}-CH_2-COOR$$

wherein R represents an alkyl group of the formula $C_nH_{2n+1}$ wherein $n$ is a positive integer from 1 to 4, and from 70 to 98% by weight of methyl α-methacrylate.

6. A resinous copolymer containing in the polymer molecule from 2 to 30% by weight of an acetylated enol of an ester represented by the formula:

$$CH_3-\overset{O}{\overset{\|}{C}}-CH_2-CH_2-COOR_1$$

wherein $R_1$ represents an alkyl group of the formula $C_nH_{2n+1}$ wherein $n$ is a positive integer from 1 to 4, and from 70 to 98% by weight of methyl α-methacrylate.

7. A resinous copolymer containing in the polymer molecule from 2 to 30% by weight of an acetylated enol of an ester represented by the formula:

$$CH_3-\overset{O}{\overset{\|}{C}}-CH_2-COOR$$

wherein R represents an alkyl group of the formula $C_nH_{2n+1}$ wherein $n$ is a positive integer from 1 to 4, and from 70 to 98% by weight of vinyl acetate.

8. A resinous copolymer containing in the polymer molecule from 2 to 30% by weight of an acetylated enol of ethyl acetoacetate and from 70 to 98% by weight of an ester represented by the formula:

$$CH_2=\underset{CH_3}{\overset{}{C}}-COOR_5$$

wherein $R_5$ represents an alkyl group of the formula $C_nH_{2n+1}$ wherein $n$ is a positive integer from 1 to 4.

9. A resinous copolymer containing in the polymer molecule from 2 to 30% by weight of an acetylated enol of methyl levulinate and from 70 to 98% by weight of an ester represented by the formula:

$$CH_2=\underset{CH_3}{\overset{}{C}}-COOR_5$$

wherein $R_5$ represents an alkyl group of the formula $C_nH_{2n+1}$ wherein $n$ is a positive integer from 1 to 4.

10. A resinous copolymer containing in the polymer molecule 2 to 30% by weight of an acetylated enol of ethyl acetoacetate and from 70 to 98% by weight of an ester represented by the formula:

$$CH_2=\underset{CH_3}{\overset{}{C}}-COOR_5$$

wherein $R_5$ represents an alkyl group of the formula $C_nH_{2n+1}$ wherein $n$ is a positive integer from 1 to 4.

11. A resinous copolymer containing in the polymer molecule 18% by weight of an acetylated enol of ethyl acetoacetate and 82% by weight of methyl α-methacrylate.

12. A resinous copolymer containing in the polymer molecule 16% by weight of an acetylated enol of methyl levulinate and 84% by weight of methyl α-methacrylate.

13. A resinous copolymer containing in the polymer molecule 30% by weight of an acetylated enol of ethyl acetoacetate and 70% by weight of vinyl acetate.

14. A process for preparing a resinous copolymer comprising heating in the presence of a peroxide polymerization catalyst a mixture consisting of from 30 to 95% by weight of an acetylated enol of an ester selected from the group consisting of those represented by the formula:

$$CH_3-\overset{O}{\overset{\|}{C}}-CH_2-COOR$$

and those represented by the formula:

$$CH_3-\overset{O}{\overset{\|}{C}}-CH_2-CH_2-COOR_1$$

wherein R and $R_1$ each represents a member selected from the group consisting of an alkyl group of the formula $C_nH_{2n+1}$ wherein $n$ is a positive integer from 1 to 4 and a benzyl group, and from 5 to 70% by weight of a copolymerizable compound selected from the group consisting of acrylonitrile, α-methacrylonitrile, acrylic acid, α-methacrylic acid, styrene, unsaturated ketones represented by the formula:

$$R_2-\overset{O}{\overset{\|}{C}}-\underset{R_3}{\overset{}{C}}=CH_2$$

wherein $R_2$ represents an alkyl group of the formula $C_nH_{2n+1}$ wherein $n$ is a positive integer from 1 to 4, and $R_3$ represents a member selected from the group consisting of a hydrogen atom and a methyl group, esters represented by the formula:

$$CH_2=\underset{R_4}{\overset{}{C}}-COOR_5$$

wherein $R_4$ represents a member selected from the group consisting of a hydrogen atom and a methyl group, and $R_5$ represents a member selected from the group consisting of an alkyl group of the formula $C_nH_{2n+1}$ wherein $n$ is a positive integer from 1 to 4 and a benzyl group, vinyl esters represented by the formula:

$$R_6-COOCH=CH_2$$

wherein $R_6$ represents an alkyl group of the formula $C_nH_{2n+1}$ wherein $n$ is a positive integer from 1 to 3, and α-acyloxyacrylonitriles represented by the formula:

$$CH_2=\underset{OOC-R_7}{\overset{}{C}}-CN$$

wherein $R_7$ represents an alkyl group of the formula $C_nH_{2n+1}$ wherein $n$ is a positive integer from 1 to 3.

15. A process for preparing a resinous copolymer comprising heating in the presence of a peroxide polymerization catalyst a mixture consisting of from 30 to 95% by weight of an acetylated enol of an ester represented by the formula:

$$CH_3-\overset{O}{\overset{\|}{C}}-CH_2-COOR$$

wherein R represents an alkyl group of the formula $C_nH_{2n+1}$ wherein $n$ is a positive integer from 1 to 4, and from 5 to 70% by weight of an ester represented by the formula:

$$CH_2=\underset{CH_3}{\overset{}{C}}-COOR_5$$

wherein $R_5$ represents an alkyl group of the formula $C_nH_{2n+1}$ wherein $n$ is a positive integer from 1 to 4.

16. A process for preparing a resinous copolymer comprising heating in the presence of a peroxide polymerization catalyst a mixture consisting of from 30 to 95% by weight of an acetylated enol of an ester represented by the formula:

$$CH_3-\overset{O}{\underset{\|}{C}}-CH_2-CH_2-COOR_1$$

wherein $R_1$ represents an alkyl group of the formula $C_nH_{2n+1}$ wherein $n$ is a positive integer from 1 to 4, and from 5 to 70% by weight of an ester represented by the formula:

$$CH_2=\underset{\underset{CH_3}{|}}{C}-COOR_5$$

wherein $R_5$ represents an alkyl group of the formula $C_nH_{2n+1}$ wherein $n$ is a positive integer from 1 to 4.

17. A process for preparing a resinous copolymer comprising heating in the presence of a peroxide polymerization catalyst a mixture consisting of from 30 to 95% by weight of an acetylated enol of an ester represented by the formula:

$$CH_3-\overset{O}{\underset{\|}{C}}-CH_2-COOR$$

wherein R represents an alkyl group of the formula $C_nH_{2n+1}$ wherein $n$ is a positive integer from 1 to 4, and from 5 to 70% by weight of an ester represented by the formula:

$$R_6-COOCH=CH_2$$

wherein $R_6$ represents an alkyl group of the formula $C_nH_{2n+1}$ wherein $n$ is a positive integer from 1 to 3.

HUGH J. HAGEMEYER, JR.

No references cited.